United States Patent
Hyun

(10) Patent No.: US 10,659,221 B2
(45) Date of Patent: May 19, 2020

(54) METHOD FOR MANAGING KEY IN SECURITY SYSTEM OF MULTICAST ENVIRONMENT

(71) Applicant: HANWHA TECHWIN CO., LTD., Seongnam-si (KR)

(72) Inventor: Ho Jae Hyun, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/475,908

(22) PCT Filed: Nov. 21, 2017

(86) PCT No.: PCT/KR2017/013222
§ 371 (c)(1),
(2) Date: Jul. 3, 2019

(87) PCT Pub. No.: WO2018/128264
PCT Pub. Date: Jul. 12, 2018

(65) Prior Publication Data
US 2019/0356480 A1    Nov. 21, 2019

(30) Foreign Application Priority Data

Jan. 6, 2017    (KR) .......................... 10-2017-0002550

(51) Int. Cl.
*H04L 9/08* (2006.01)
*H04L 12/18* (2006.01)
(Continued)

(52) U.S. Cl.
CPC .......... *H04L 9/0827* (2013.01); *H04L 9/0822* (2013.01); *H04L 9/0833* (2013.01);
(Continued)

(58) Field of Classification Search
CPC ... H04L 9/0819; H04L 9/0822; H04L 9/0827; H04L 9/083; H04L 9/0833;
(Continued)

(56) References Cited

U.S. PATENT DOCUMENTS

| 6,049,878 A | 4/2000 | Caronni et al. |
| 7,561,694 B1 * | 7/2009 | Chakrabarti .......... H04L 9/0822 |
| | | 380/270 |

(Continued)

FOREIGN PATENT DOCUMENTS

| KR | 10-0660385 B1 | 12/2006 |
| KR | 10-2008-0114665 A | 12/2008 |

OTHER PUBLICATIONS

Search Report dated Feb. 12, 2018, issued by the International Searching Authority in International Application No. PCT/KR2017/013222 (PCT/ISA/210).
(Continued)

*Primary Examiner* — Shanto Abedin
*Assistant Examiner* — Adrian Stoica
(74) *Attorney, Agent, or Firm* — Sughrue Mion, PLLC

(57) ABSTRACT

Provided is a method of managing keys in a security system of a multicast environment. The key managing method according to the embodiments of the present disclosure enables key management that a key renewal regarding a receiver joining or leaving a group does not affect all groups.

14 Claims, 7 Drawing Sheets

(51) Int. Cl.
*H04L 29/06* (2006.01)
*H04N 7/18* (2006.01)

(52) U.S. Cl.
CPC ........ *H04L 12/185* (2013.01); *H04L 63/0442* (2013.01); *H04N 7/18* (2013.01)

(58) Field of Classification Search
CPC ............. H04L 12/1813; H04L 12/1845; H04L 12/185; H04L 12/1854; H04L 12/189; H04L 63/0428; H04L 63/0435; H04L 63/0442; H04L 63/0464
See application file for complete search history.

(56) References Cited

U.S. PATENT DOCUMENTS

| | | |
|---|---|---|
| 8,837,738 B2 | 9/2014 | Huang et al. |
| 2005/0097061 A1* | 5/2005 | Shapiro ............... G06F 21/6209 705/67 |
| 2005/0204161 A1* | 9/2005 | Caronni ................ H04L 9/0822 726/5 |
| 2010/0278336 A1* | 11/2010 | Tahan ................... G06F 21/606 380/46 |
| 2010/0325695 A1* | 12/2010 | Suzuki .................... G06F 21/10 726/3 |
| 2011/0016307 A1 | 1/2011 | Killian et al. |
| 2011/0051912 A1 | 3/2011 | Sundaram et al. |
| 2011/0249817 A1 | 10/2011 | Park et al. |
| 2012/0257756 A1 | 10/2012 | Huang et al. |

OTHER PUBLICATIONS

Written Opinion dated Feb. 12, 2018, issued by the International Searching Authority in International Application No. PCT/KR2017/013222 (PCT/ISA/237).

\* cited by examiner

METHOD FOR MANAGING KEY IN SECURITY SYSTEM OF MULTICAST ENVIRONMENT

TECHNICAL FIELD

The present disclosure relates to a method for managing keys in a security system of a multicast environment.

BACKGROUND ART

In an environment where there are remote receivers (an NVR, a CMS, a viewer, etc.) for receiving real-time images from a network camera, a unicast transmission method requires generation of channels by as many as the number of receivers, and thus, load on the network camera increases and network bandwidth consumption is significant.

DESCRIPTION OF EMBODIMENTS

Technical Problem

Provided are a security system and a key managing method for efficiently managing a security key in case of a change of a receiver group.

Solution to Problem

According to an aspect of the present disclosure, a method of managing a key in a security system of a multicast environment including a first manager communicating with a sender and a second manager communicating with a receiver includes a step in which the sender encrypts image data with a random key and transmits encrypted image data to the receiver via a first multicast channel; a step in which the sender encrypts the random key with a personal key shared with the first manager and transmits an encrypted random key to the first manager via a unicast channel; a step in which the first manager decrypts the random key encrypted with the personal key, encrypts a decrypted random key with a manager key shared with the second manager, and transmits an encrypted random key to the second manager via a second multicast channel; a step in which the second manager decrypts the random key encrypted with the manager key, encrypts a decrypted random key with a group key shared with the receiver, and transmits an encrypted random key to the receiver via a third multicast channel; and a step in which the receiver decrypts the random key encrypted with the group key and decrypts the image data received via the first multicast channel by using a decrypted random key.

The method may further include a step in which the first manager renews the manager key and transmits a renewed manager key to the second manager via the second multicast channel.

The method may further include a step in which the second manager receives a local group join request including authentication information from the receiver; a step in which the second manager transmits the authentication information to the sender via the first manager; a step in which the second manager receives a result of authentication of the receiver by the sender from the first manager; and a step in which, when the receiver is successfully authenticated, the second manager allows the receiver to join the local group.

The method may further include a step in which, when the receiver is successfully authenticated, the first manager allows the second manager to join a manager group.

The second manager may determine a local group for the receiver based on a type of the receiver.

The second manager may configure a first local group with a large dynamic change of receivers and a second local group with a small dynamic change of receivers.

The second manager may periodically renew a group key of the first local group and renew a group key of the second local group immediately when a member change occurs in the second local group.

The method may further include a step in which the second manager receives a local group leave request from the receiver; a step in which the second manager renews the group key; and a step in which the second manager excludes the receiver from the local group and transmits the renewed group key encrypted with the personal key of the remaining receivers to the remaining receivers of the local group via the third multicast channel.

According to an aspect of the present disclosure, a method of managing a key in a security system of a multicast environment including a first manager communicating with a sender and a second manager communicating with a receiver includes a step in which the second manager receives a local group join request including authentication information from the receiver; a step in which the second manager transmits authentication information regarding the receiver to the first manager; a step in which the second manager receives a result of authentication of the receiver by the sender from the first manager; and, a step in which, when the receiver is successfully authenticated, the second manager registers the receiver to a local group list and allows the receiver to join the local group.

The method may further include a step in which, when the receiver is successfully authenticated, the first manager allows the second manager to join a manager group that the first manager already joined.

The method may further include a step in which the first manager renews a manager key shared in the manager group and transmits a renewed manager key to the second manager.

The second manager may determine a local group for the receiver based on a type of the receiver.

The second manager may periodically renew a group key of a first local group having a large dynamic change of receivers and renew a group key of a second local group having a small dynamic change of receivers immediately when a member change occurs in the second local group.

According to an aspect of the present disclosure, a method of managing a key in a security system of a multicast environment including a first manager communicating with a sender and a second manager communicating with a receiver includes a step in which the second manager receives a local group leave request from the receiver; a step in which the second manager renews a local group key; and a step in which the second manager deletes the leave requesting receiver from a pre-stored local group list and transmits a renewed local group key to the other receivers remaining in the local group list.

According to an aspect of the present disclosure, a security system of a multicast environment, the security system includes a first manager configured to receive an encrypted random key from a sender via a unicast channel, decrypt the encrypted random key by using a personal key shared with the sender, encrypt a decrypted random key with a manager key, and transmit an encrypted random key via a second multicast channel; and a second manager configured to decrypt the random key encrypted with the manager key by using the manager key shared with the first manager, encrypt a decrypted random key with a group key, and transmit an encrypted random key to a receiver via a third multicast channel.

The receiver may decrypt the random key encrypted with the group key by using the group key shared between the receiver and the second manager and decrypt image data received from the sender via a first multicast channel by using a decrypted random key.

The first manager may renew the manager key and transmit a renewed manager key to the second manager via the second multicast channel.

The second manager may receive a local group join request including authentication information from the receiver, transmit the authentication information to the sender via the first manager, receive a result of authentication of the receiver by the sender from the first manager, and, when the receiver is successfully authenticated, allow the receiver to join the local group.

The first manager may allow the second manager to join a manager group when the receiver is successfully authenticated.

The second manager may determine a local group for the receiver based on a type of the receiver and determine a period for renewing a group key for each local group.

The second manager may periodically renew a group key of a first local group having a large dynamic change of receivers and renew a group key of a second local group having a small dynamic change of receivers immediately when a member change occurs in the second local group.

The second manager may receive the local group leave request from the receiver, renew the group key, exclude the receiver requesting leave from the local group, and transmit a renewed group key encrypted with the personal key of the remaining receivers to the remaining receivers of the local group via the third multicast channel.

Advantageous Effects of Disclosure

A key managing system according to the embodiments of the present disclosure enables key management that a key renewal regarding a receiver joining or leaving a group does not affect all groups.

BEST MODE

According to an aspect of the present disclosure, a security system of a multicast environment includes a first manager configured to receive an encrypted random key from a sender via a unicast channel, decrypt the encrypted random key by using a personal key shared with the sender, encrypt a decrypted random key with a manager key, and transmit an encrypted random key via a second multicast channel; and a second manager configured to decrypt the random key encrypted with the manager key by using the manager key shared with the first manager, encrypt a decrypted random key with a group key, and transmit an encrypted random key to a receiver via a third multicast channel.

The receiver may decrypt the random key encrypted with the group key by using the group key shared between the receiver and the second manager and decrypt image data received from the sender via a first multicast channel by using a decrypted random key.

MODE OF DISCLOSURE

Hereinafter, the present disclosure will be described in detail with reference to the accompanying drawings.

Figure 1:
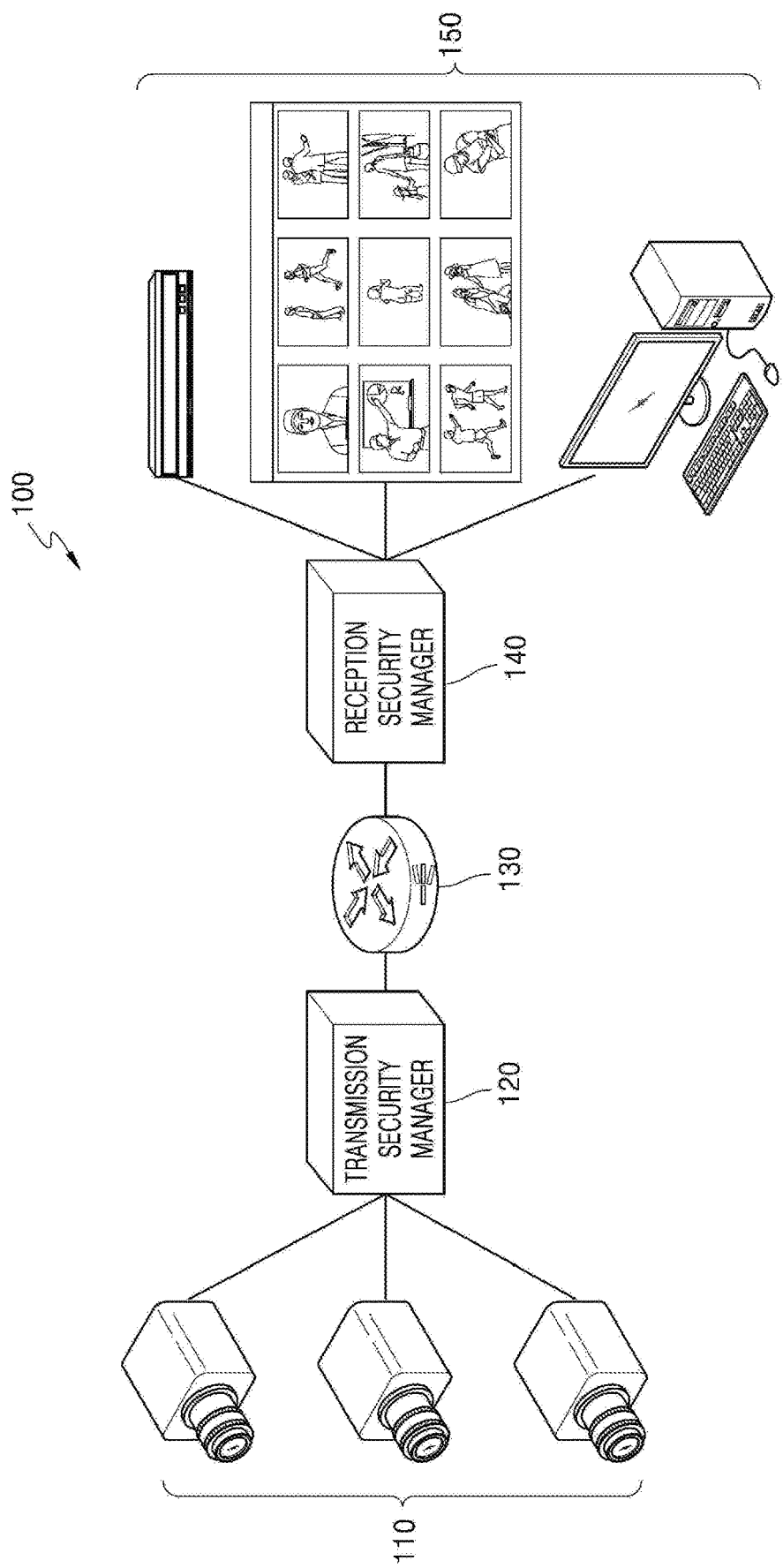
FIG. 1 is a schematic diagram of a multicast security system according to an embodiment of the present disclosure.

FIG. 1 is a schematic diagram of a multicast security system according to an embodiment of the present disclosure.

Referring to FIG. 1, a multicast security system 100 may include a camera 110, a first manager 120, a multicast router 130, a second manager 140, and a receiver 150.

The camera 110 may be a pan/tilt/zoom (PTZ) camera having panning/tilting/zooming functions and disposed at a fixed position of a specific place. The camera 110 may be a network camera included in a specific network.

The camera 110 is a sender that transmits image data to the receiver 150. The camera 110 may encrypt and transmit image data to the receiver 150 without going through the first manager 120 and the second manager 140. The camera 110 may encrypt a random key used to encrypt the image data and transmit an encrypted random key to the receiver 150 via the first manager 120 and the second manager 140.

The first manager 120 may be a transmission security manager operating in conjunction with the camera 110, and the second manager 140 may be a reception security manager operating in conjunction with the receiver 150. Hereinafter, the first manager 120 and the second manager 140 will be referred to as a transmission security manager 120 and a reception security manager 140, respectively.

When the multicast secure transmission function is activated by an administrator, the camera 110 may activate the transmission security manager 120 and receive a personal key from the activated transmission security manager 120. The personal key is a key shared only between the transmission security manager 120 and the camera 110. Also, the camera 110 may perform authentication of the receiver 150 through a receiver list registered by the administrator.

The transmission security manager 120 may transmit an authentication information regarding the receiver 150 to the camera 110 and may transmit an authentication result to the reception security manager 140.

The transmission security manager 120 may transmit a manager group multicast address (hereinafter referred to as a manager group address) and a manager key to the reception security manager 140, which is to join a manager group. The manager group is a multicast group including at least one transmission security manager 120 and at least one reception security manager 140. The manager key is a group key shared between security managers in the manager group. When authentication of the receiver 150 is successful, the transmission security manager 120 may allow the reception security manager 140 to join the manager group by transmitting a manager group address and a manager key to the reception security manager 140.

When the transmission security manager 120 receives a random key encrypted with a personal key of the camera 110, the transmission security manager 120 may decrypt the random key, encrypt a decrypted random key with the manager key, and transmit an encrypted random key to the manager group at a manager group multicast channel (that is, the manager group address). In addition, the transmission security manager 120 may periodically renew the manager key and transmit a renewed manager key to the manager group via the manager group multicast channel. The transmission security manager 120 may generate a new manager key (that is, renewing a manager key) by using a random value and encrypt the new manager key (that is, a renewed manager key) with a previous manager key.

The multicast router 130 may generate a communication path for transmitting and receiving information by connecting a network between the camera 110 and the receiver 150. The multicast router 130 may rout information transmitted and received by the transmission security manager 120 and the reception security manager 140. The reception security manager 140 may transmit authentication information regarding the receiver 150 to the transmission security manager 120 and, when authentication is successful, the reception security manager 140 may perform a process for joining the manager group by receiving an authentication result, a manager group address, and a manager key from the transmission security manager 120. The reception security manager 140 may transmit a local group key, a local group multicast address (hereinafter referred to as a local group address), and a personal key to an authenticated receiver 150. Here, the personal key is a key shared only between the reception security manager 140 and the receiver 150.

When the reception security manager 140 receives an encrypted renewed manager key, the reception security manager 140 may decrypt the encrypted renewed manager key by using a previous manager key that the reception security manager 140 has and obtain the renewed manager key. When the reception security manager 140 receives an encrypted random key from the transmission security manager 120, the reception security manager 140 may decrypt the encrypted random key by using the manager key, encrypt a decrypted random key by using a local group key, and transmit an encrypted random key to a local group at a local group multicast channel (that is, a local group address).

The reception security manager 140 may configure a local group according to a member change rate. A local group may include a local group with less frequent member changes including receivers like a network video recorder (NVR), a digital video recorder (DVR), and a camera manage system (CMS) and a local group with frequent member changes including receivers like a web viewer (personal computer) and a mobile viewer (mobile device).

Members join and/or leave the local group with less frequent member changes less frequently, whereas members join and/or leave the local group with frequent member changes frequently. When a receiver joins and/or leaves a local group, the reception security manager 140 renews a key immediately and also needs to renew a key periodically. When a receiver that seldomly joins and/or leaves and a receiver that frequently joins and/or leaves belong to the same local group, the number of renewals of the key of the receiver that seldomly joins and/or leaves may be unnecessarily increased.

A multicast transmission scheme may reduce bandwidth waste and transmission overhead of a unicast-based network caused by redundant data transmission due to simultaneous transmission of a single information stream to many receivers. For example, in an environment where an equipment set including a CMS and an NVR at a remote location is connected to more than one network, real-time image data of a network camera may be transmitted by utilizing a multicast transmission scheme instead of the unicast transmission scheme.

On the other hand, a multicast communication is less efficient for controlling accesses to groups as compared to unicast/broadcast communication. Also, since the multicast communication is routed through more communication links than unicast communication, the multicast communication may receive many security attacks like an identity theft, a service denial, a retransmission attack, and a transmission record denial.

To provide security against security attacks, it is necessary to renew a group key every time a receiver joins or leaves a receiver group for a front-end security for preventing a receiver leaving a multicast group from knowing details of communication after the receiver leaves and a back-end security for preventing a new receiver joining the multicast group from knowing details of communication before the new receiver joins. Also, there needs to be group key management to prevent a key renewal from affecting the entire group.

Embodiments of the present disclosure may provide an efficient method of providing security by configuring a local group considering dynamic changes of receivers to limit the influence of the dynamic changes of the receivers of the local group to the corresponding local group range rather than all groups and renewing only a corresponding group key.

The receiver 150 may request image data to the camera 110 and may receive encrypted image data from the camera 110 via a data multicast channel. The receiver 150 may be an NVR, a DVR, a CMS, a viewer (a PC or a mobile device), etc. The receiver 150 may receive a random key used for encrypting the image data from the camera 110 via a multicast channel which is different from the data multicast channel.

When the receiver 150 requests a connection to the camera 10 and a multicast security function is activated at the camera 110, the receiver 150 may activate the reception security manager 140 and receive a personal key from the activated reception security manager 140. The personal key is a key shared only between the reception security manager 140 and the receiver 150.

The receiver 150 may transmit a data multicast group address and authentication information regarding the receiver 150 to the activated reception security manager 140.

Figure 2:
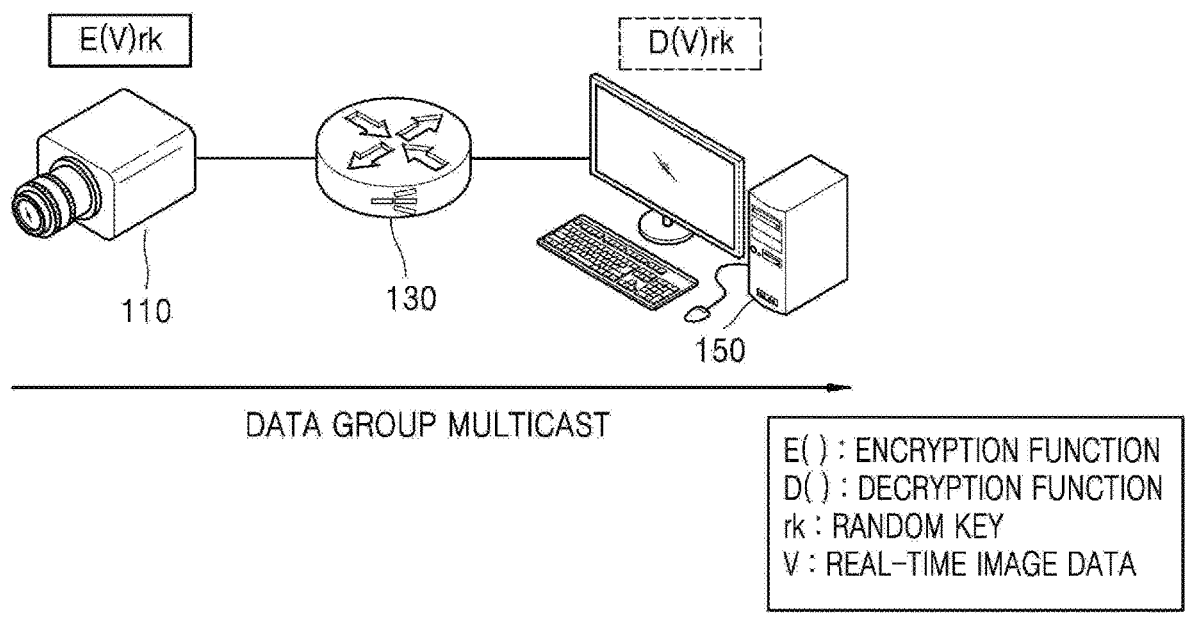
FIG. 2 is a diagram showing transmission of image data according to an embodiment of the present disclosure.
Figure 3:
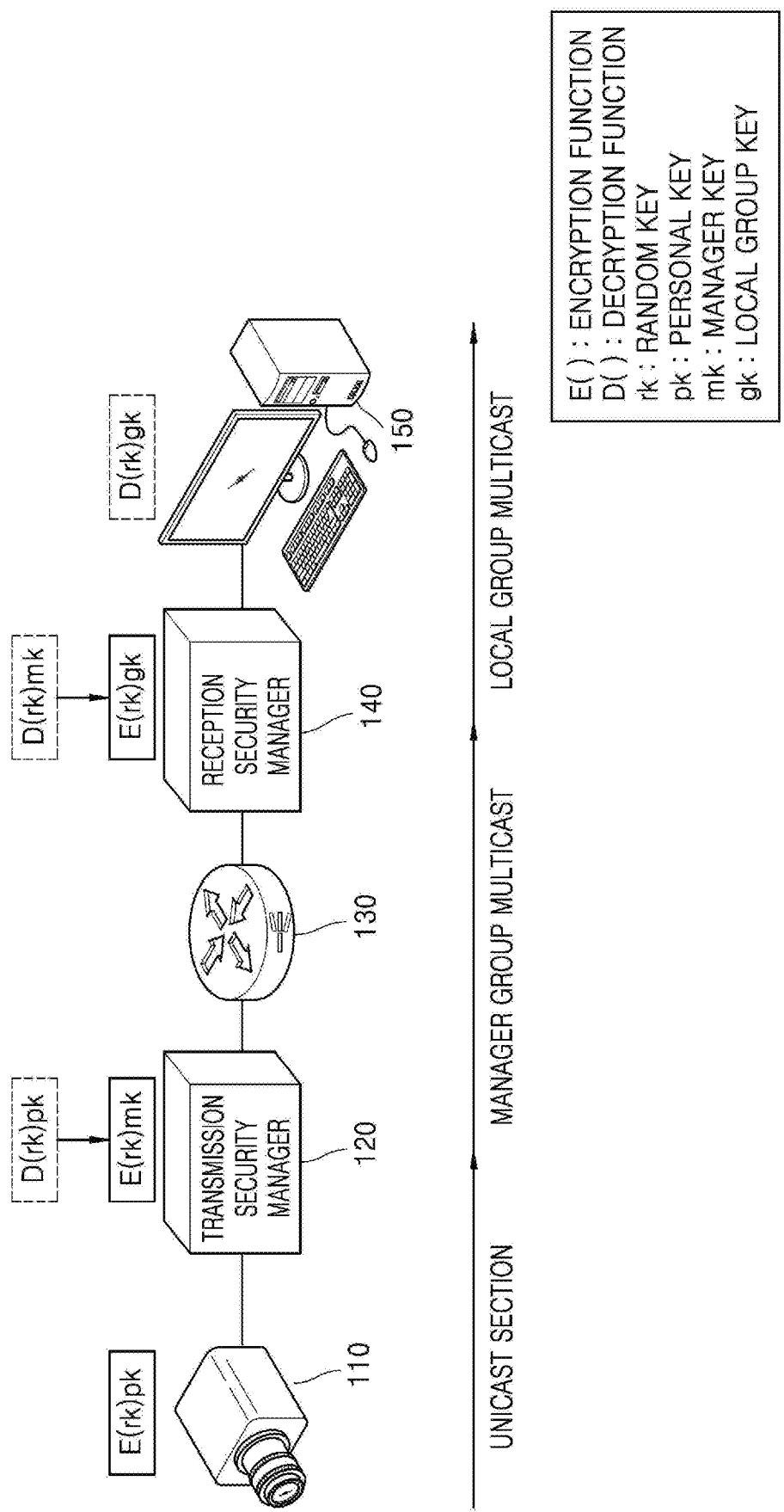
FIG. 3 is a diagram showing transmission of a random key according to an embodiment of the present disclosure.

FIG. 2 is a diagram showing transmission of image data according to an embodiment of the present disclosure. FIG. 3 is a diagram showing transmission of a random key according to an embodiment of the present disclosure. Referring to FIGS. 2 and 3, in an embodiment of the present disclosure, image data is encrypted with a random key and transmitted from the camera 110, which is a sender, to the receiver 150 via a data multicast channel, and a random key for decrypting the encrypted image data is transmitted from the camera 110 to the receiver 150 via the transmission security manager 120 and the reception security manager 140 in a unicast channel and a group multicast channel. In other words, in the embodiment of the present disclosure, since image data is transmitted without passing through a security manager, the security manager only performs transmission of a security key, and thus there is no data transmission load on the security manager.

Referring to FIG. 2, the camera 110 may encrypt E(V)rk image data V by using a new random key rk for each packet and transmit the encrypted image data to the receiver 150 via a data group multicast channel. The multicast router 130 may transmit the encrypted image data of the camera 110 to a network having the receiver 150 that joined a data multicast group.

Referring to FIG. 3, the camera 110 may encrypt E(rk)pk the random key rk with a personal key pk and transmit the encrypted random key to the transmission security manager 120 via a unicast channel. Here, the personal key pk is a key that the camera 110 receives in advance from the transmission security manager 120 and shared between the camera 110 and the transmission security manager 120.

The transmission security manager 120 may decrypt D(rk)pk the encrypted random key transmitted from the camera 110 by using the personal key pk shared with the camera 110 and encrypt E(rk)mk the decrypted random key with a manager key mk. The transmission security manager 120 may transmit the encrypted random key encrypted with the manager key mk via a manager group multicast channel.

The multicast router 130 may transmit the encrypted random key, which is encrypted E(rk)mk with the manager key mk transmitted by the transmission security manager 120, via the manager group multicast channel of a network including the reception security manager 140 that joined the manager group.

The reception security manager 140 may decrypt D(rk)mk the encrypted random key transmitted by the transmission security manager 120 with the manager key mk, encrypt E(rk)gk a decrypt random key rk with a local group key gk, and transmit the encrypted random key rk to a local group. The reception security manager 140 may receive a manager key from the transmission security manager 120 in advance as the receiver 150 is successfully authenticated by the camera 110. The manager key is a key shared between the transmission security manager 120 and the reception security manager 140 belonging to the same manager group.

The receiver 150 may decrypt D(rk)gk the encrypted random key encrypted E(rk)gk with the local group key gk with the local group key gk received from the reception security manager 140. The receiver 150 may decrypt D(V)rk the encrypted image data by using the decrypted random key rk. The receiver 150 may receive a local group key from the reception security manager 140 in advance as the receiver 150 is successfully authenticated by the camera 110. The local group key is a key shared only between the reception security manager 140 and the receiver 150. The receiver 150 may receive a personal key for decrypting an encrypted renewed local group key from the reception security manager 140 in advance and share the personal key with the reception security manager 140.

Figure 4:
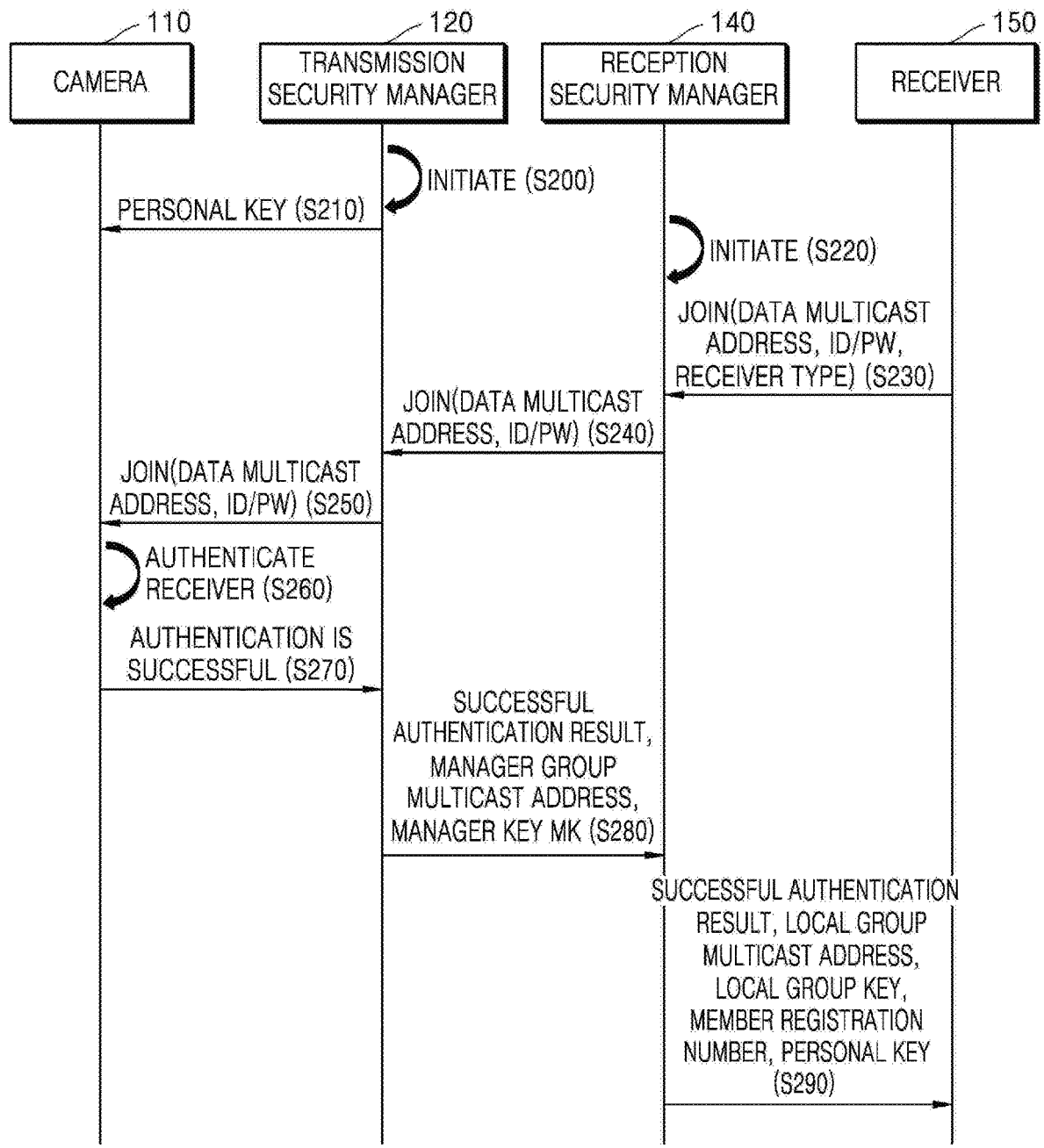
FIG. 4 is a diagram showing a procedure for a new receiver to join a local group according to an embodiment of the present disclosure.

FIG. 4 is a diagram showing a procedure for a new receiver to join a local group according to an embodiment of the present disclosure.

Referring to FIG. 4, when a multicast security transmission function of the camera 110 is activated, the camera 110 may check whether the transmission security manager 120 of a network (e.g., a local network) is operating. When the transmission security manager 120 is not operating, the camera 110 may activate the transmission security manager 120 (operation S200). The transmission security manager 120 may transmit a personal key to the camera 110 (operation S210). The personal key may be used to encrypt and decrypt a random key between the camera 110 and the transmission security manager 120.

Similarly, when the receiver 150 is to join a local group, the receiver 150 may check whether the receiver security manager 140 is operating and, when the reception security manager 140 is not operating, the receiver 150 may activate the reception security manager 140 (operation S220).

The receiver 150 may transmit a data multicast address, authentication information, and receiver type information to the reception security manager 140 to join the local group (operation S230). The authentication information may include an identifier ID of the receiver 150 and a password PW. The receiver type information may include information regarding a receiver characteristic, the information indicating whether the receiver is an NVR, a DVR, a CMS, a web viewer, a mobile viewer, etc. The reception security manager 140 may categorize authenticated receivers 150 into local groups according to receiver types. For example, the reception security manager 140 may categorize the authenticated receivers 150 into a local group of receivers with small dynamic changes like join/leave (that is, a local group with less frequent member changes) and a local group of receivers with large dynamic changes like join/leave (that is, a local group with frequent member changes). The reception security manager 140 may determine a local group according to the receiver type of a new authenticated receiver 150.

The reception security manager 140 may set different group key renewal message transmission cycles for respective local groups. For example, the group key renewal message transmission cycle for a local group with frequent member changes may be shorter than the group key renewal message transmission cycle of a local group with less frequent member changes. In another embodiment, the reception security manager 140 may renew the group key of the local group with less frequent member changes at a set period and renew the group key of the local group with frequent member changes only when a member change occurs. Even in this case, the reception security manager 140 may renew the group key when a member change occurs in the local group with less frequent member changes and may additionally perform periodic group key renewal for the local group with frequent member changes.

The reception security manager 140 may transmit the data multicast address and the authentication information transmitted by the receiver 150 to the transmission security manager 120 (operation S240).

The transmission security manager 120 may transmit the data multicast address and the authentication information to the camera 110 (operation S250).

The camera 110 may perform a receiver authentication process based on a registered receiver list (operation S260) and transmit an authentication result (authentication success or authentication failure) to the transmission security manager 120 (operation S270).

When the transmission security manager 120 receives an authentication result indicating that the receiver 150 is successfully authenticated, the transmission security manager 120 may transmit the authentication result, a manager group address, and a manager key to the reception security manager 140 (operation S280). The manager key may be used to encrypt and decrypt a random key between the transmission security manager 120 and the reception security manager 150.

The reception security manager 140 may join the manager group by receiving the manager group address and the manager key, register the authenticated receiver 150 as a member of a local group, and transmit the authentication result, a local group address, a local group key, a member registration number, and a personal key to the receiver 150 (operation S290). The reception security manager 140 may select a local group for the receiver 150 based on the receiver type information. The local group key may be used to encrypt and decrypt a random key between the reception security manager 140 and the receiver 150. The personal key may be used to encrypt and decrypt a local group key between the receiver security manager 140 of the receiver 150 and the receivers 150 in the local group.

Figure 5:
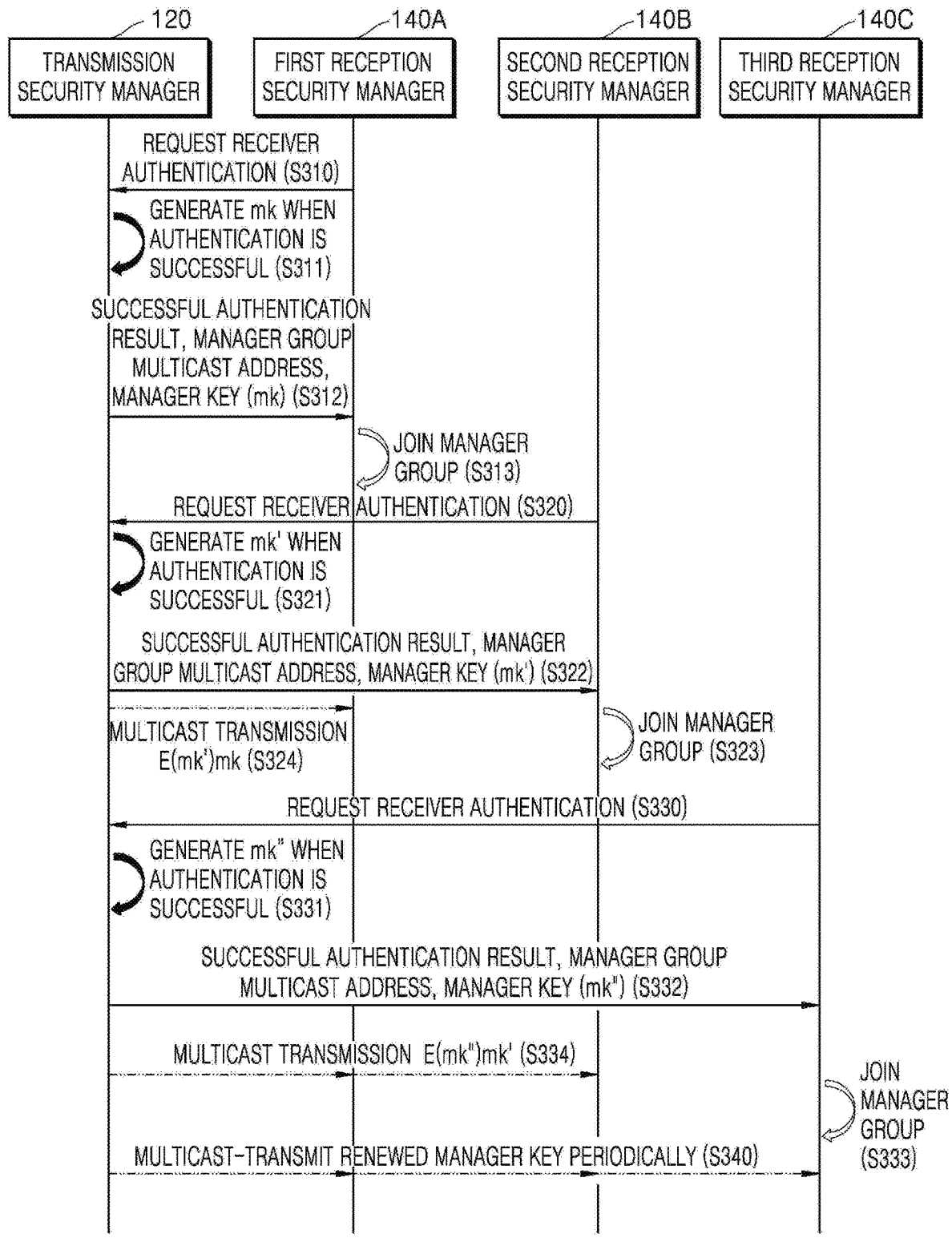
FIG. 5 is a diagram showing a procedure that a plurality of reception security managers join a manager group according to an embodiment of the present disclosure.

FIG. 5 is a diagram showing a procedure that a plurality of reception security managers join a manager group according to an embodiment of the present disclosure. Although the embodiment shown in FIG. 5 shows that first to third reception security managers join a manager group. the present disclosure is not limited thereto and may be identically applied to any number of reception security managers joining a manager group.

Referring to FIG. 5, first to third reception security managers 140A to 140C may request to join a manager group by transmitting authentication information regarding receivers to the transmission security manager 120.

When the transmission security manager 120 receives an authentication request including authentication information regarding a first receiver from the first reception security manager 140A (operation S310), the transmission security manager 120 may transmit the authentication request of the first receiver to the camera 110. The transmission security manager 120 may receive an authentication result regarding the first receiver from the camera 110, generate a manager key when the first receiver is successfully authenticated (operation S311), and transmit the authentication result, a manager group address, and a generated manager key mk to the first reception security manager 140A (operation S312). Accordingly, the first reception security manager 140A may join the manager group (operation S313). The first reception security manager 140A that joined the manager group may terminate a unicast channel for communication with the transmission security manager 120 and communicate with the transmission security manager 120 via a manager group multicast channel.

Thereafter, when the transmission security manager 120 receives an authentication request including authentication information regarding a second receiver from a new second reception security manager 140B (operation S320), the transmission security manager 120 may transmit the authentication request of the second receiver to the camera 110. The transmission security manager 120 may receive an authentication result regarding the second receiver from the camera 110, newly generate (renew) a manager key when the second receiver is successfully authenticated (operation S321), and transmit the authentication result, a manager group address, and a renewed manager key mk' to the second reception security manager 140B (operation S322). Accordingly, the second reception security manager 140B may join the manager group (operation S323). The second reception security manager 140B that joined the manager group may terminate a unicast channel for communication with the transmission security manager 120 and communicate with the transmission security manager 120 via a manager group multicast channel.

Also, the transmission security manager 120 may transmit a key renewal message, which is generated by encrypting E(mk')mk a manager key mk' newly generated by using a previous manager key mk to transmit a renewed manager key, to the first reception security manager 140A that already joined the manager group via the manager group multicast channel (operation S324).

Thereafter, when the transmission security manager 120 receives an authentication request including authentication information regarding a third receiver from a new third reception security manager 140C (operation S330), the transmission security manager 120 may transmit the authentication request of the third receiver to the camera 110. The transmission security manager 120 may receive an authentication result regarding the third receiver from the camera 110, newly generate (renew) a manager key when the third receiver is successfully authenticated (operation S331), and transmit the authentication result, a manager group address, and a renewed manager key mk" to the third reception security manager 140C (operation S332). Accordingly, the third reception security manager 140C may join the manager group (operation S333). The third reception security manager 140C that joined the manager group may terminate a unicast channel for communication with the transmission security manager 120 and communicate with the transmission security manager 120 via a manager group multicast channel.

Also, the transmission security manager 120 may transmit a key renewal message, which is generated by encrypting E(mk")mk' a manager key mk" newly generated by using a previous manager key mk' to transmit a renewed manager key, to the first reception security manager 140A and the second reception security manager 140B that already joined the manager group via the manager group multicast channel (operation S334).

Even when there is no join/leave of the reception security manager 140, the transmission security manager 120 may periodically renew a manager key to maintain security, encrypt the renewed manager key with a previous manager key, and transmit an encrypted manager key via the manager group multicast channel (operation S340). The transmission security manager 120 may generate a key renewal message by generating a new manager key by using a random value and encrypting the new manager key with a previous manager key.

Figure 6:
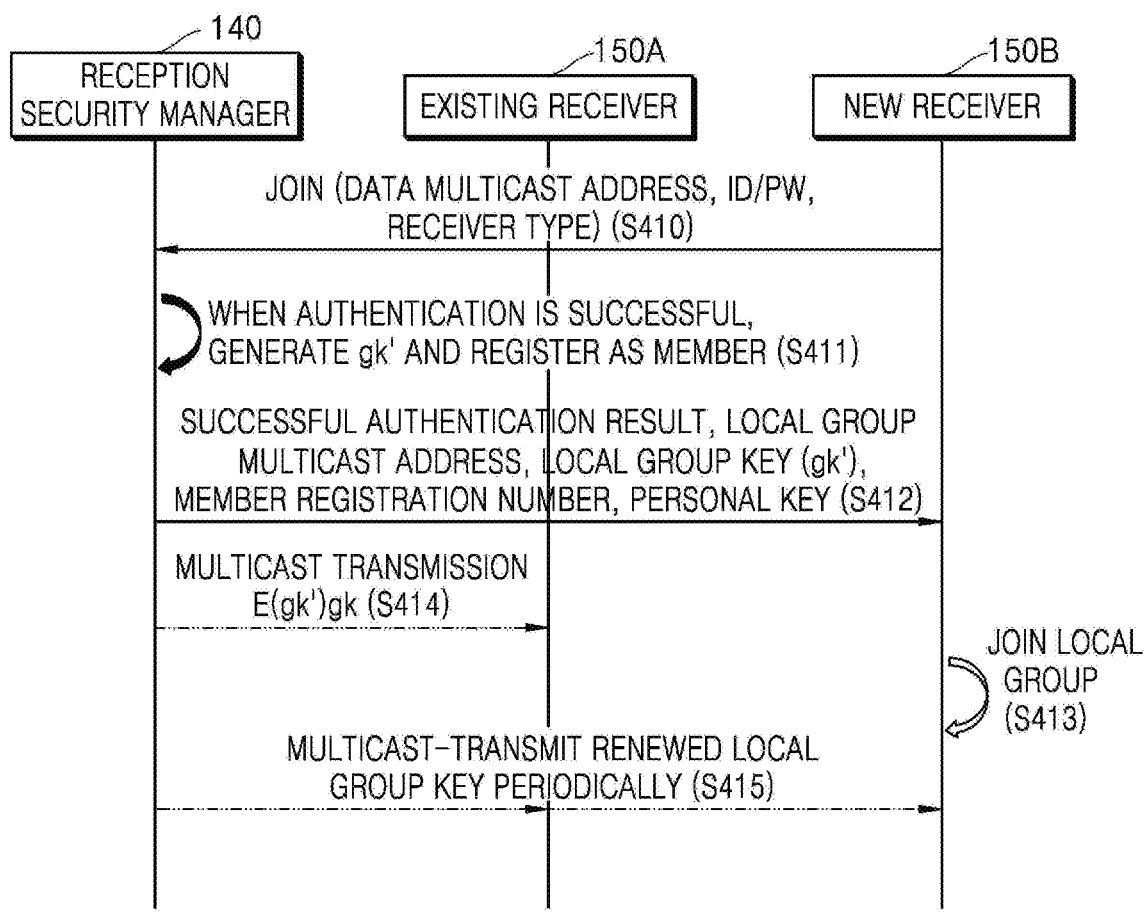
FIG. 6 is a diagram showing a procedure for a new receiver to join a local group with an existing receiver according to an embodiment of the present disclosure.

FIG. 6 is a diagram showing a procedure for a new receiver to join a local group with an existing receiver according to an embodiment of the present disclosure.

Referring to FIG. 6, a new receiver 150B may transmit a data multicast address, authentication information, and receiver type information to the reception security manager 140 to join a local group (operation S410). Referring back to FIG. 4, the reception security manager 140 may transmit the data multicast address and the authentication information transmitted from the receiver 150 to the transmission security manager 120, and the transmission security manager 120 may transmit the data multicast address and the authentication information to the camera 510.

The reception security manager 140 may receive a result of authentication performed by the camera 110 from the transmission security manager 120 and, when the authentication is successful, the reception security manager 140 may add the new receiver 150B to a local group member list and register the new receiver 150B as a member of the local group (operation S411).

The reception security manager 140 may newly generate (renew) a local group key and transmit a local group address, a newly generated local group key gk', a member registration number, and a personal key to the new receiver 150B added to the local group member list via a unicast channel (operation S412).

The new receiver 150B may terminate the unicast channel with the reception security manager 140 and join the local group (operation S413).

Also, the reception security manager 140 may transmit a key renewal message, which is generated by encrypting E(gk')gk a local group key gk' newly generated by using a previous local group key gk to transmit a renewed local group key, to an existing receiver 150A via a local group multicast channel (a local group address) (operation S414).

When there is no join/leave of receivers and a local group key is used for a long time, the reception security manager 140 may periodically renew the local group key and transmit a renewed local group key to a local group address for security (operation S415). The renewed local group key may be encrypted by using a previous local group key, may be configured as a key renewal message, and the key renewal message may be transmitted to the local group address.

Figure 7:
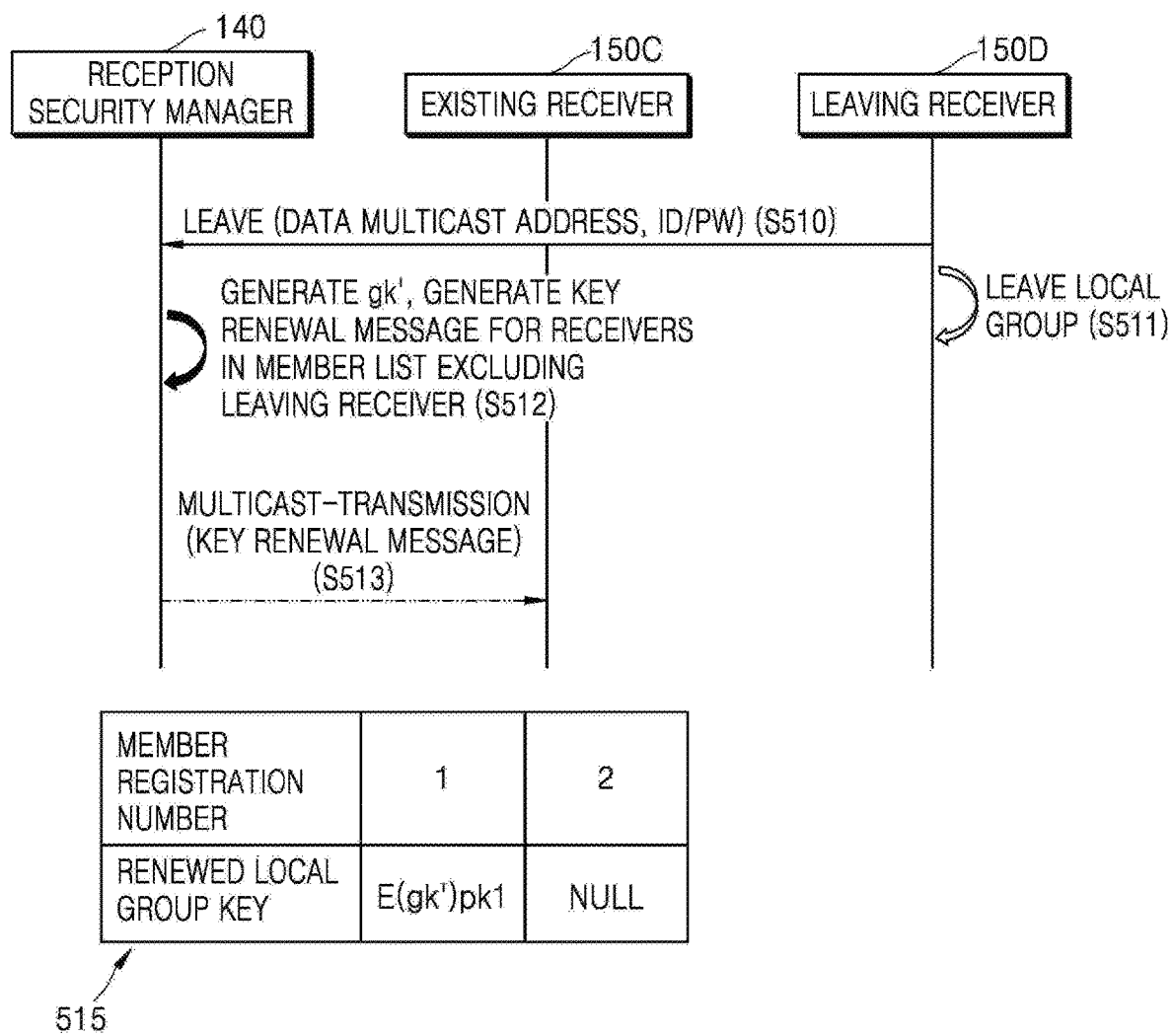
FIG. 7 is a diagram illustrating a procedure for a receiver to leave a local group according to an embodiment of the present disclosure.

FIG. 7 is a diagram illustrating a procedure for a receiver to leave a local group according to an embodiment of the present disclosure.

Referring to FIG. 7, a leaving receiver 150D may transmit a leave request message including a data multicast address and authentication information to the reception security manager 140 (operation S510) and leave the group (operation S511). The leave request message may be encrypted with a personal key of the leaving receiver 150D and transmitted.

The reception security manager 140 may delete the leaving receiver 150D from the local group member list, newly generate a local group key, and transmit the newly generated local group key to the remaining receivers of the local group (operation S512). The reception security manager 140 may configure a key renewal message 515 for transmitting the newly generated local group key to the remaining receivers. At this time, in a key renewal message 515, a local group key gk', which is newly generated by using the personal key of each receiver, is encrypted and inserted into the member registration number field of the remaining receivers, and a null value may be inserted into the member registration number field of the leaving receiver 150D. Therefore, the renewed local group key may be prevented from being known to the leaving receiver 150D even when the leaving receiver 150D receives the key renewal message 515.

FIG. 7 exemplifies the key renewal message 515 in which a local group key gk' encrypted by using a personal key pk1 of the existing receiver 150C is inserted into a member registration number field 1 corresponding to the existing receiver 150C and a null value is inserted into a member registration number field 2 corresponding to the leaving receiver 150D. According to embodiments of the present disclosure, a group key may be easily renewed and transmitted/received by using a member registration number.

The reception security manager 140 may transmit the key renewal message 515 to the local group multicast channel (local group address) to transmit the key renewal message 515 to the existing receiver 150C (operation S513).

According to embodiments of the present disclosure, it is easy to process a join of a new receiver by a reception security manager 140 and a leave of a receiver by a reception security manager based on member information registered to and stored in the reception security manager 140.

A security manager according to the present disclosure may be implemented with any number of hardware and/or software configurations that perform particular functions. For example, a transmission security manager and/or a reception security manager may refer to a data processing device embedded in hardware, having circuitry physically structured to perform functions represented by code or instructions in a program. In one embodiment, a security manager may be implemented as a daemon processor within a sender or a receiver or may be a separate data processing device that interfaces with the sender or the receiver via a secure session.

A key managing method according to an embodiment of the present disclosure transmits image data and an encryption key for encrypting the image data via separate channels, and thus, there is no additional consumption of resources (e.g., buffer, CPU, network bandwidth) for a security manager to transmit an encryption key and image data together.

Also, in the key managing method according to an embodiment of the present disclosure, a reception security manager does not renew individual keys. Rather, a transmission security manager renews keys and transmits renewed keys to the reception security manager. Therefore, time synchronization work needed when each security manager renews a key is not required. Therefore, a server for time synchronization is not needed, and thus, problems including key renewal failure and key synchronization failure due to an error of a time synchronization server may be prevented.

Also, the key managing method according to the embodiment of the present disclosure does not need a separate server for receiver authentication, because a sender stores and manages a receiver list. Also, a reception security manager may join a manager group through a receiver authentication by a sender.

Furthermore, the key managing method according to an embodiment of the present disclosure may easily process leaving of a receiver based on a local group member list to which a reception security manager registers receivers.

The key managing method according to an embodiment of the present disclosure may be implemented as computer-readable code on a computer-readable recording medium. The computer-readable recording medium includes all kinds of recording apparatuses in which data that may be read by a computer system is stored. Examples of the computer-readable recording medium include ROM, RAM, a CD-ROM, magnetic tape, a floppy disk, an optical data storage, etc. The computer-readable recording medium can also be distributed over network-coupled computer systems so that the computer readable code is stored and executed in a distributed fashion. In addition, functional programs, code, and code segments for implementing the present disclosure may be easily inferred by programmers of the technical field to which the present disclosure belongs.

Although aspects of the present invention are described with reference to the embodiments illustrated in the accompanying drawings, they are merely examples, and one of ordinary skill in the art will understand that various modifications and other equivalent embodiments may be derived therefrom. Accordingly, the true scope of the present disclosure should be determined only by the appended claims.

The invention claimed is:

1. A method of managing a key in a security system of a multicast environment comprising a first manager communicating with a sender and a second manager communicating with a receiver, the method comprising:

a step in which the sender encrypts image data with a random key and transmits the encrypted image data to the receiver via a first multicast channel;

a step in which the sender encrypts the random key with a personal key shared with the first manager and transmits the encrypted random key with the personal key to the first manager via a unicast channel;

a step in which the first manager decrypts the random key encrypted with the personal key, encrypts the decrypted random key encrypted using the personal key with a manager key shared with the second manager, and transmits the encrypted random key with the manager key to the second manager via a second multicast channel;

a step in which the second manager decrypts the random key encrypted with the manager key, encrypts the decrypted random key encrypted using the manager key with a group key shared with the receiver, and transmits the encrypted random key with the group key to the receiver via a third multicast channel; and a step in which the receiver decrypts the random key encrypted with the group key and decrypts the image data received via the first multicast channel by using the decrypted random key encrypted using the group key.

2. The method of claim 1, further comprising a step in which the first manager renews the manager key and transmits the renewed manager key to the second manager via the second multicast channel.

3. The method of claim 1, further comprising:
a step in which the second manager receives a local group join request comprising authentication information from the receiver;
a step in which the second manager transmits the authentication information to the sender via the first manager;
a step in which the second manager receives a result of authentication of the receiver by the sender from the first manager; and,
a step in which, when the receiver is successfully authenticated, the second manager allows the receiver to join the local group as a group member.

4. The method of claim 3, further comprising a step in which, when the receiver is successfully authenticated, the first manager allows the second manager to join a manager group.

5. The method of claim 3, wherein the second manager determines the local group for the receiver based on a type of the receiver.

6. The method of claim 5, wherein the second manager periodically renews a group key of a first local group and renews a group key of a second local group based on a rate of chance in a number of group members in the second local group being higher than a rate of chance in a number of group members in the first local group and immediately when the group member change occurs in the second local group.

7. The method of claim 3, further comprising:
a step in which the second manager receives a local group leave request from the receiver;
a step in which the second manager renews the group key; and
a step in which the second manager excludes the receiver from the local group and transmits the renewed group key encrypted with the personal key of the remaining receivers to the remaining receivers of the local group via the third multicast channel.

8. A security system of a multicast environment, the security system comprising:
a first manager configured to receive an encrypted random key from a sender via a unicast channel, decrypt the encrypted random key by using a personal key shared with the sender, encrypt the decrypted random key encrypted using the personal key with a manager key, and transmit the encrypted random key with the manager key via a second multicast channel; and
a second manager configured to decrypt the random key encrypted with the manager key by using the manager key shared with the first manager, encrypt the decrypted random key encrypted using the manager key with a group key, and transmit the encrypted random key with the group key to a receiver via a third multicast channel,
wherein the receiver decrypts the random key encrypted with the group key by using the group key shared between the receiver and the second manager and decrypts image data received from the sender via a first multicast channel by using the decrypted random key encrypted using the group key.

9. The system of claim 8, wherein the first manager renews the manager key and transmits the renewed manager key to the second manager via the second multicast channel.

10. The system of claim 8, wherein the second manager receives a local group join request including authentication information from the receiver, transmits the authentication information to the sender via the first manager, receives a result of authentication of the receiver by the sender from the first manager, and, when the receiver is successfully authenticated, allows the receiver to join the local group as a group member.

11. The system of claim 8, wherein the first manager allows the second manager to join a manager group when the receiver is successfully authenticated.

12. The system of claim 10, wherein the second manager determines a local group for the receiver based on a type of the receiver and determines a period for renewing a group key for each local group.

13. The system of claim 12, wherein the second manager periodically renews a group key of a first local group and renews a group key of a second local group based on a rate of change in a number of group members in the second local group being higher than a rate of change in a number of group members in the first local group and immediately when the group member change occurs in the second local group.

14. The system of claim 12, wherein the second manager receives the local group leave request from the receiver, renews the group key, excludes the receiver requesting leave from the local group, and transmits the renewed group key encrypted with the personal key of the remaining receivers to the remaining receivers of the local group via the third multicast channel.

* * * * *